Sept. 3, 1946.  L. E. WOOD  2,407,200
FOLLOW-UP MECHANISM
Filed Dec. 11, 1944
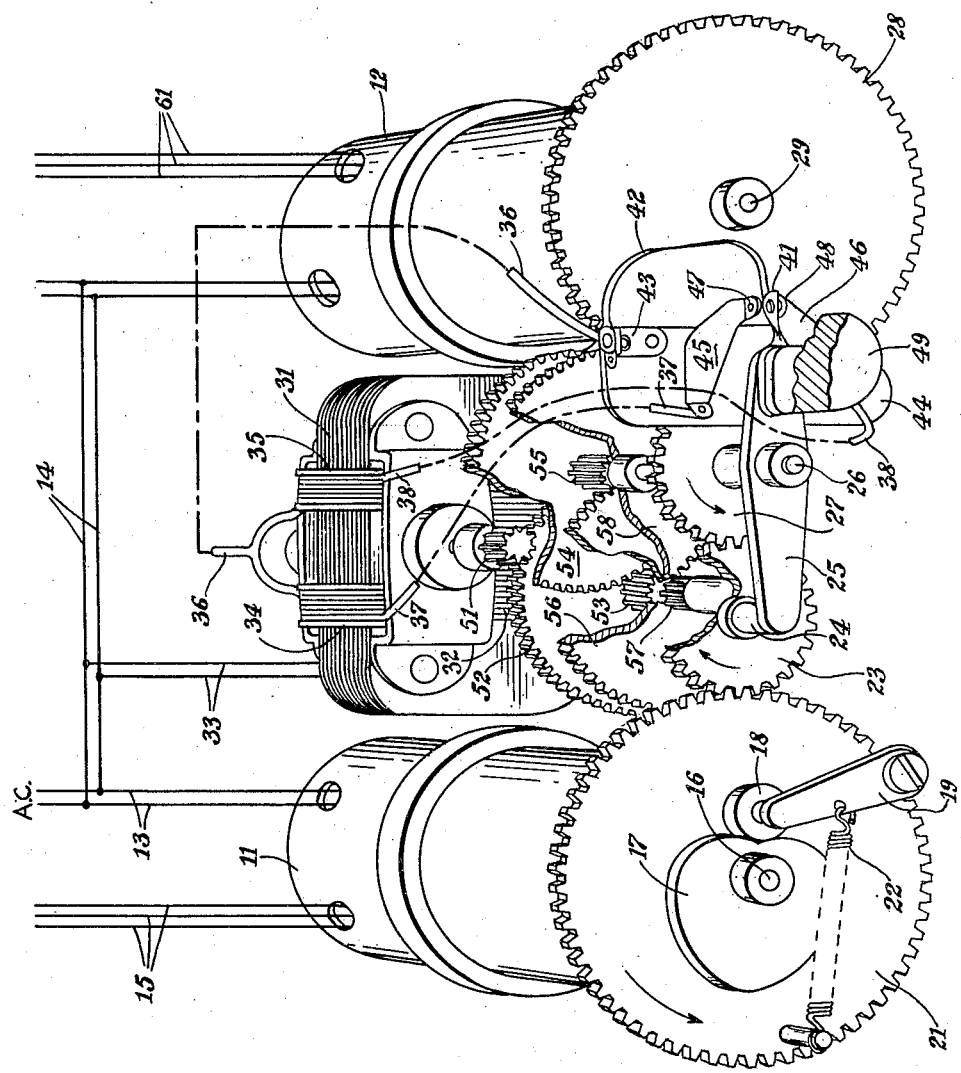
Louvan E. Wood
INVENTOR.
BY Ray D Bateman
ATTORNEY.

Patented Sept. 3, 1946

2,407,200

UNITED STATES PATENT OFFICE 2,407,200

FOLLOW-UP MECHANISM

Louvan E. Wood, Baltimore, Md., assignor to Bendix Aviation Corporation, South Bend, Ind., a corporation of Delaware Application December 11, 1944, Serial No. 567,576

6 Claims. (Cl. 172—239)

1

The present invention relates to follow-up mechanisms, and more particularly to mechanisms of the character in which a driven member is synchronously driven from a driving member and is maintained in substantially positional agreement therewith at all times.

In wind direction indicating instruments it is common to transmit the mechanical motion of the wind instrument to a self-synchronous motor, and to electrically connect the latter to one or more self-synchronous receiver motors, for repeating the indication at one or more remotely located stations. It has been found that due to the inherent mode of operation of the wind indicator there is a tendency for it to oscillate back and forth, especially when the wind direction changes, and the present invention deals with a follow-up mechanism specifically designed to eliminate the foregoing disadvantages of prior wind direction transmitter systems; and while it is particularly advantageous for applications of this character, it is not limited to such use.

It is accordingly the primary object of this invention to provide a novel follow-up mechanism which will take the signal from a self-synchronous transmitter motor and reproduce the signal in terms of angular position of a driving shaft, with a minimum oscillation or "overshooting" incident to changes in the direction and magitude of the received signal, and to secure a substantial power amplification.

Another important object is to provide a follow-up mechanism embodying driving and driven members having a floating gear assembly therebetween, and power operated means, automatically actuated in accordance with the degree and direction of float of the gear assembly, to apply rotative efforts to the driven member in accordance with whether it is manifesting tendencies to either lead or lag the driving member and possessing a highly desirable damping action which is operable to prevent sufficiently rapid response of the driven member to produce oscillation or overshooting.

A further object is to provide a follow-up mechanism for incorporation in a system having receiver and transmitter self-synchronous motors, and embodying a power amplifying device, automatically operable in accordance with the leading or lagging tendencies of the transmitter motor, and embodying a sufficiently high degree of speed reduction, to effectively prevent the transmitter motor from responding to momentary fluctuations in the speed or direction of the receiver motor.

2

Another object is to provide a novel synchronous drive in which it is unnecessary to employ slip rings or the like to conduct electricity between moving and stationary parts.

The invention also aims to provide a novel follow-up mechanism embodying intergeared driving and driven devices and a yieldable coupling and a torque responsive switch, designed to permit deviations varying as much as 360° of the driving device with respect to the driven device and yet is operable to constantly tend to bring the parts into synchronism.

Further objects will become apparent as the specification proceeds on conjuction with the annexed drawing, and from the appended claims.

In the drawing, the single figure illustrates the follow-up mechanism of the invention in perspective, with parts broken away and in section to facilitate an understanding of the structure.

With continued reference to the drawing, there illustrated in schematic form, with the frame omitted, the follow-up mechanism of the invention applied to a self-synchronous receiver motor 11 and a self synchronous transmitter motor 12, as examples of driving and driven devices between which the follow-up mechanism of the invention may be interposed. Motor 11 receives its signals from the secondary of the self-synchronous transmitter motor of a wind direction indicator or the like (not shown), and transmitter motor 12 transmits its signals to one or more self-synchronous receiver motors, for repeating the indication at various remotely located stations, in the manner well understood in the art.

It has been found that by interposing the follow-up mechanism of the invention between the self-synchronous motors, it is possible to smooth out the fluctuations which were inherent in prior systems of this character, and to obtain a steady reading of the repeaters without substantial wavering or overshooting, and at the same time secure a power amplification of considerable magnitude.

The primaries of motors 11 and 12 are connected to a supply of alternating current by lines 13 and 14 in well known manner. The incoming signal is transmitted to the secondary of motor 11 by lines 15, which causes the rotor of motor 11 to follow the angular position of the transmitter, in a manner well understood in the art.

Rigidly secured to shaft 16 of motor 11 is a heart-shaped cam 17. The latter cooperates with a roller 18 carried by a lever 19, which is pivotally mounted on a gear 21, and urged into engagement with the cam by means of a tension spring 22. Gear 21 is journaled for free rotation on shaft 16, with the result that in the event that there is a tendency for gear 21 to be retarded or restrained from rotation, cam 17 will freely rotate, causing roller 18 to travel up on the "high" part of the cam. When the retarding or restraining force is removed spring 22 will return the gear and cam to the positions illustrated.

Gear 21 meshes with a planet gear 23, which is journaled on shaft portion 24 of a planet or rocker arm 25. The latter is mounted for free rocking movement on a shaft 26, which rigidly carries a sun gear 27. The sun gear meshes with planet gear 23, and with a gear 28 rigidly secured to shaft 29 of transmitter motor 12.

From the foregoing disclosure it is apparent that since gears 21 and 28 are of identical size, and are connected by an idler gear assembly, they are connected together for a one-to-one ratio of rotation. However, as will be hereinafter set forth, the idler gears are incapable of transmitting power between the two motors, and any tendency of motor 11 to lead or lag motor 12 is relied upon to rock planet arm 25 through a small angle and control the operation of a power motor in such manner as to achieve a compensated synchronous rotation of the motors.

The power motor 31 illustrated is of the well known alternating current type embodying a main field 32 energized by alternating current leads 33 and a plurality of shading coils, two of which, 34 and 35, are shown, and which have a common lead 36. It will be understood that whenever lead 37 of coil 34 is connected to line 36 the motor will rotate in one direction, and whenever lead 38 of coil 35 is connected to the common lead it will rotate in the opposite direction.

Automatic control of the motor is effected by rigidly mounting contact 41 on the end of planet arm 25, remote from gear 23, and connecting it through a flexible lead 42, to a binding post 43 carried by an insulating body member 44, which may be stationarily supported in any suitable manner. The common coil lead 36 is secured to binding post 43, and individual shading coil leads 37 and 38 are connected to brackets 45 and 46 which are carried by insulated member 44 and carry contacts 47 and 48, which are disposed either side of contact 41, and in the illustrated embodiment of the invention are disposed in close proximity thereto. I have found that a total travel of contact 41, necessary to effect reversal of the motor, of approximately twenty thousandths of an inch, gives very satisfactory results. The clearance has been exaggerated in the drawing for purposes of illustration. It is to be understood, however, that the clearance between the contacts will be determined by the operating characteristics desired in the particular application to which the invention is put.

In order to counterbalance the weight of arm 25, and gear 23 carried thereby, a balance weight 49 is preferably secured thereto adjacent the contacts and has sufficient mass to substantially balance the parts. This is desirable because the switch is operated in response to torquing forces of relatively small magnitude, being limited by the force set up by spring 22 urging roller 18 into engagement with cam 17.

The shaft of power motor 31 carries a pinion 51 which meshes with a gear 52, which in turn carries a pinion 53 meshing with a gear 54. The latter is rigidly secured to a pinion 55, the bracket and gear unit being freely journaled on shaft 26. A gear 56 meshes with pinion 55 and in turn drives a pinion 57, the latter meshing with a gear 58 which, in this case, is rigidly secured to shaft 26, with the result that the output of motor 31 is applied to idler gear 27 and through it drives the transmitter motor through the intermediary of gear 28. While I prefer to employ the assembly shown, because it is compact and embodies a minimum of parts, it is to be understood that if desired the power motor may apply rotative efforts to a separate gear on shaft 29 and all of the advantages of the invention retained.

The signal corresponding to the angular position of shaft 29 of motor 12 is transmitted to the secondaries of one or more self-synchronous receiver motors by means of leads 61, which are connected to the secondary of motor 12.

Assuming now that a signal is received by motor 11 which results in rotation of shaft 16 through a predetermined angular position, say 15° counter-clockwise, gear 21 cannot immediately respond to this degree of angular movement due to the large gear reduction existing between gear 27 and pinion 51 of motor 31, with the result that roller 18 rolls up on cam 17 against the tension of spring 22. The latter, through lever 19, produces a rotative force in planet gear 23 tending to rotate it clockwise. Since gear 23 cannot rotate, because it is meshing with locked gear 27, it undergoes a slight planetation in a clockwise direction producing a slight clockwise rocking movement of arm 25. This causes contact 41 to engage contact 48, thereby connecting shading coil lead 38 to common terminal 36, as shown. This results in a rotation of power motor 31 in such direction as to produce counter-clockwise rotation of gear 27 (and clockwise rotation of gear 28), and this condition obtains as long as roller 18 is displaced from its low point, in which it appears in the drawing.

By providing a comparatively large gear reduction between motor 31 and gear 27, it is apparent that there is a lagging or delaying action set up between motors 11 and 12, and that any rapid change in the angular position of shaft 16 will be reflected in a corresponding angular position of shaft 29, only in the event that shaft 16 remains in such position for a period of time sufficiently great to permit power motor 31 to bring shaft 29 into positional agreement therewith. There is accordingly established a compensatory delaying or retarding action. This is highly desirable in wind direction and other instruments. The speed reduction and power motor also produce a power output or torque amplification which is highly desirable in systems of this character.

In the event that there is only a slight oscillation of the signal, reflecting a minor reversal of direction of the wind or other instrument, planet arm 25 will alternately connect leads 37 and 38 of the shading coils to their common terminal 36, thereby causing the transmitter motor 12 to undergo a rocking action of extremely small magnitude, in view of the great speed reduction between the power motor and motor 12. Should the wind or other indicating device undergo only a gradual change in speed or direction, insufficient to raise roller 18 out of its low position on cam 17, the planet arm will make the appropriate circuit to cause motor 31 to supply sufficient power to maintain motor 12 in synchronism with motor 11.

This is the only condition under which motor 12 will exactly follow motor 11.

From the foregoing disclosure it is apparent that by providing a planetary mechanism for controlling the switching of the power motor circuits, and providing a resilient yielding coupling between the receiver motor shaft and the planetary gearing, a follow-up mechanism is achieved having the highly desirable feature of an inherent degree of lag whereby it will effectively synchronize the parts when the change in the wind direction or other measurement is of small magnitude; will introduce a delay or lag when changes of large magnitude are involved, thereby providing steady indications irrespective of fluctuating or erratic conditions in the transmitting end of the system; and at the same time will provide a power amplification. Also, by employing a planetary system, related to the parts in novel manner so that torquing forces are set up whenever the parts are out of phase, and utilizing the torquing forces to actuate the switch of the power motor, and providing a yielding connection, for permitting the parts to go out of synchronism to a substantial degree, while constantly setting up forces which urge the switch parts in such direction as to cause the power motor to synchronize the parts, a device is achieved which, when stable conditions are attained insures accurate positioning of the driven member with respect to the driving member, and yet, during periods of major fluctuations of the driving member, permits the parts to go out of synchronism by as much as 360°.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced thereby.

What is claimed, and desired to be secured by United States Letters Patent is:

1. In a synchronous drive, driving and driven self-synchronous motors disposed in cooperative relationship, and carrying driving and driven gears respectively; a rockable carrier pivoted adjacent said motors; a planet gear journaled on said carrier and meshing with said driving gear; a sun gear meshing with said planet gear and said driven gear; a reversible power motor having driving connection with, and operable to apply rotative efforts to said driven motor; and circuit means, automatically controlled by rocking movement of said carrier, for so controlling said power motor as to cause said driven motor to synchronously follow said driving motor.

2. The synchronous drive defined in claim 1, wherein said power motor is operable to apply rotative efforts to said sun gear.

3. The synchronous drive defined in claim 1, wherein a sufficiently great speed reduction is embodied in said power motor driving connection to cause said driven motor to lag behind said driving motor whenever the latter undergoes changes in speed or direction in excess of predetermined magnitudes.

4. The synchronous drive defined in claim 1, wherein said driving gear is coupled to said driving motor by yieldable means, which is operable to permit substantial departures of said driving and driven motors from synchronism, but constantly exerts resilient forces acting upon said circuit means and tending to restore the parts to synchronism.

5. In a drive mechanism, a driving shaft and a driven shaft journaled for rotation about spaced parallel axes; spur gears on said shafts; a pair of idler gears meshing with each other and said spur gears; means mounting one of said idler gears for floating movement in response to torquing forces, a two-position switch mechanism actuated in accordance with the float of said idler gear; and yieldable coupling means connecting said driving shaft to its spur gear, comprising resilient means operable to cause said idler gear to float into one of its switch actuating positions whenever the parts are out of synchronism.

6. The drive mechanism defined in claim 5, together with a power motor drivingly connected to said driven shaft and having circuit means automatically controlled by said switch mechanism for rotating said driven shaft in a direction to bring it into synchronism with said driving shaft.

LOUVAN E. WOOD.